(12) United States Patent
Griswold et al.

(10) Patent No.: US 6,245,431 B1
(45) Date of Patent: Jun. 12, 2001

(54) BAKEWARE RELEASE COATING

(75) Inventors: Roy M. Griswold, Ballston Spa; David C. Gross, Clifton Park; Peter M. Miranda, Glenville, all of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/460,447

(22) Filed: Dec. 13, 1999

Related U.S. Application Data

(60) Provisional application No. 60/155,366, filed on Sep. 20, 1999.

(51) Int. Cl.$^7$ .................................................. B32B 15/08
(52) U.S. Cl. .................. 428/450; 428/447; 524/265; 524/266; 524/267; 524/268; 525/477; 528/17; 528/18; 528/19; 528/33
(58) Field of Search ..................................... 428/447, 450; 524/265, 266, 267, 268; 525/477; 528/17, 18, 19, 33

(56) References Cited

U.S. PATENT DOCUMENTS

| | | |
|---|---|---|
| 2,464,242 | 3/1949 | Lane . |
| 2,504,388 | 4/1950 | Braley . |
| 2,606,510 | 8/1952 | Collings . |
| 2,672,104 | 3/1954 | Clark . |
| 3,002,946 | 10/1961 | Thomas . |
| 3,308,079 | 3/1967 | Haenni . |
| 3,308,080 | 3/1967 | Haenni . |
| 3,419,514 | 12/1968 | Hadlock . |
| 3,632,793 | 1/1972 | Antonen . |
| 3,925,276 | 12/1975 | Merrill . |
| 4,087,478 | 5/1978 | Keil . |
| 4,204,021 | 5/1980 | Becker ................................. 428/325 |
| 4,302,512 | 11/1981 | Weitemeyer et al. ................ 428/447 |
| 4,443,502 | 4/1984 | Gutek ................................... 427/387 |
| 4,546,018 | 10/1985 | Ryuzo et al. ...................... 427/407.2 |
| 4,585,705 | 4/1986 | Broderick et al. .................. 428/447 |
| 4,677,147 | 6/1987 | Swihart et al. ...................... 524/268 |
| 4,681,908 | 7/1987 | Broderick et al. .................. 524/268 |
| 4,895,766 | 1/1990 | Saad .................................... 428/447 |

FOREIGN PATENT DOCUMENTS 1448985  9/1976  (GB) .

Primary Examiner—D. S. Nakarani

(57) ABSTRACT

An organosiloxane release coating composition useful for coating bakeware.

17 Claims, No Drawings

BAKEWARE RELEASE COATING

This application claims rights of priority from U.S. Provisional Patent Application Serial No. 60/155,366, filed Sep. 20, 1999, which is hereby incorporated by reference.

TECHNICAL FIELD

The present invention is directed to an organosiloxane composition, more specifically, to an organosiloxane release coating useful for coating bakeware.

BACKGROUND

Release coatings have long been used in industrial bakeries to provide release of baked goods. The coatings typically provide non-crazing, release coatings required for the several hundred baking cycles at temperatures as high as 550° F. before requiring recoating of the baking pan. These organosiloxane coatings are typically resinous coatings which contain aryl substituted polyorganosiloxanes such as $CH_3SiO_{3/2}$, $C_6H_5SiO_{3/2}$, $C_6H_5(CH_3)SiO_{3/2}$, and $(C_6H_5)_2SiO$ units (see, for example, U.S. Pat. No. 4,677,147, U.S. Pat. No. 4,681,908, U.S. Pat. No. 4,585,705, and U.S. Pat. No. 4,895,766). There are increasing toxicological concerns over aryl functional organosiloxanes being used for food contact applications such as coating baking pans. Unfortunately, coatings based solely on non-aryl substituted siloxanes have not yielded coatings which provide the performance of aryl substituted polysiloxanes.

What is needed in the art is a non-aryl substituted polysiloxane coating that provides the high performance characteristics of known aryl substituted polysiloxane coatings.

SUMMARY OF THE INVENTION

In a first aspect, the present invention is directed to a curable silicone bakeware release composition comprising: a) a functional silicone resin containing $RSiO_{3/2}$, $R_2SiO$, and $R_3SiO_{1/2}$ units, wherein each R is independently alkyl, OH, alkoxy or acyloxy, provided that at least one of R per molecule is OH, alkoxy or acyloxy; b) a functional polydialkylsiloxane fluid; c) a polydialkylsiloxane fluid; and d) an effective amount of a curing agent, wherein the composition is substantially free of aryl substituted silicone compounds. Preferably, each R is independently $(C_1-C_6)$alkyl, $(C_1-C_6)$alkoxy and $(C_6-C_{12})$acyloxy, more preferably methyl, such that the resin has from about 0.05 up to about 10 weight percent hydroxy, alkoxy or acyloxy radicals attached to the silicon atoms.

The composition of the present invention is effective in providing a release coating for bakeware.

As used herein, the terms "crazing" means cracking of the coating as observed after being placed in a 550° F. oven for 24 hours, and "non-crazing" means no observable change in the appearance of the coating after being placed in a 550° F. oven for 24 hours.

DETAILED DESCRIPTION OF THE INVENTION

Preferably, the first preferred embodiment of the composition of the present invention comprises, from about 35.0 to about 99.895 parts by weight ("pbw"), more preferably from about 35.0 to about 55.0 pbw, of the functional resin; from about 0.1 to about 2.0 pbw, more preferably from about 0.4 to about 1.6 pbw, of the functional polydimethylsiloxane fluid; from about 0.005 to about 2.0 pbw, more preferably from about 0.01 to about 2.0 pbw, of the polydimethylsiloxane fluid; and from about 0.1 to about 2.0 pbw, more preferably from about 0.2 to about 1.0 pbw, of the curing agent.

A highly preferred embodiment of the present invention further comprises from about 55.0 to about 65.0 pbw, more preferably from about 56.0 to about 64.0 pbw, even more preferably from about 58.0 pbw to about 62.0 pbw of a solvent or mixture of solvents.

As used herein, the term "substantially free of aryl substituted silicone compounds" means less than about 5 parts per billion ("ppb"), preferably less than about 2 ppb, more preferably no detectable level of aryl substituents are present in the cured composition.

The functional resin may be a single silicone resin or a combination of silicone resins. Compounds suitable as the functional resin component of the present invention are those resins or combinations of resins comprised of $RSiO_{3/2}$, $R_2SiO$, and $R_3SiO_{1/2}$ units and silanol, alkoxy, acyloxy and the like functional end groups, where each R is independently alkyl, preferably $(C_1-C_6)$alkyl, most preferably methyl. The functional resin is highly branched. Preferably, the functional resin has a viscosity of from about 10 to about 10,000 centistokes and a solids content of from about 40 to about 60 percent at 25° C. Resins suitable for use in the present invention preferably have from about 0.05 up to about 10 percent by weight hydroxy, alkoxy or acyloxy functional end groups.

In a preferred embodiment, the functional resin comprises one or more compounds of the structural formula (I):

$$M_zD_xT_y \qquad (I)$$

wherein:

M is $R^1{}_3SiO_{1/2}$;

D is $R^2{}_2SiO_{2/2}$; and

T is $R^3SiO_{3/2}$;

each $R^1$, $R^2$ and $R^3$ is independently alkyl, OH, alkoxy or acyloxy, provided that at least one of $R^1$, $R^2$ and $R^3$ per molecule is OH, alkoxy or acyloxy; and x, y and z are each integers, wherein $5 \leq x \leq 20$, $80 \leq y \leq 95$ and $0 \leq z \leq 3$, more preferably wherein $5 \leq x \leq 15$, $80 \leq y \leq 90$ and $0 \leq z \leq 2$ or $1 \leq z \leq 3$. Preferably, $R^1$, $R^2$ and $R^3$ are $(C_1-C_6)$alkyl, $(C_1-C_6)$alkoxy and $(C_6-C_{12})$acyloxy, more preferably methyl, such that the resin has from about 0.05 up to about 10 weight percent hydroxy, alkoxy or acyloxy radicals attached to the silicon atoms.

As used herein, the term "$(C_1-C_6)$alkyl" means a linear or branched alkyl group containing from 1 to 6 carbons per group, such as, for example, methyl, ethyl, propyl, isopropyl, n-butyl, iso-butyl, sec-butyl, tert-butyl, pentyl, hexyl, preferably methyl.

As used herein, the term "$(C_1-C_6)$alkoxy" means a linear or branched alkoxy group containing from 1 to 6 carbons per group, such as, for example, methoxy, ethoxy, propoxy, and butoxy.

Functional resins suitable for use in the present invention include, for example, silanol-stopped dimethylsiloxane, and trimethylsiloxy-stopped dimethylsiloxane.

Suitable functional resins are made by known methods, such as, for example, the hydrolysis and condensation of chlorosilanes or alkoxy silanes, and are commercially available. The functional resin can be used as is or in a solvent, such as, for example, xylene, toluene, naphtha and other similar organic solvents.

Compounds suitable as the functional polydialkylsiloxane fluid component of the present invention are those which are a linear or branched, preferably mostly linear, more preferably, linear, silicone polymer and which contain reactive functional groups. Preferably, the reactive functional groups are silanol, alkoxy, acyloxy and the like such that the fluid has from about 0.05 up to about 10 weight percent hydroxy, alkoxy or acyloxy radicals attached to the silicon atoms. Preferably, the functional polydialkylsiloxane is a polydimethylsiloxane fluid having a viscosity of from about 5 to about 100,000 centipoise at 25° C., more preferably, of from about 100 to about 50,000 centipoise at 25° C., even more preferably, of from about 1000 to about 35,000 centipoise at 25° C.

In a preferred embodiment, the functional polydialkylsiloxane fluid component comprises one or more polysiloxanes having repeating units of the average structural formula (II):

$$R^4_a SiO_{(4-a)/2} \quad (II)$$

wherein:
    each $R^4$ is independently a substituted or unsubstituted hydrocarbon radical having from about 1 to about 10 carbon atoms or OH, alkoxy or acyloxy, preferably OH, $(C_1-C_6)$alkoxy or $(C_6-C_{12})$acyloxy, provided that at least one $R^4$ group per molecule is OH, alkoxy or acyloxy, and on average, $1 \leq a \leq 3$, preferably, on average, a is 2. Preferably, $R^4$ is OH.

In a preferred embodiment, the functional polyalkylsiloxane fluid comprises fluid siloxanes having hydroxy or alkoxy endblocking, wherein a small portion of the fluid siloxanes are M units, wherein $R^4$ is methyl. As used herein, "M unit" refers to $R^4_3SiO_{1/2}$. Preferably, only a small portion of the fluid siloxanes are T units. As used herein, "T unit" refers to $R^4SiO_{3/2}$, and $R^4$ is preferably methyl. An example of a functional polyalkylsiloxane fluid suitable for use in the present invention is silanol-stopped dimethylsiloxane fluid.

In a more preferred embodiment, the functional fluid comprises one or more compounds of the structural formula (IIA):

$$M_e D_f T_g \quad (IIA)$$

wherein:
    M is $R^1_3SiO_{1/2}$;
    D is $R^2_2SiO_{2/2}$; and
    T is $R^3SiO_{3/2}$;
    each $R^1$, $R^2$ and $R^3$ is independently alkyl, OH, alkoxy or acyloxy, provided that at least one of $R^1$, $R^2$ and $R^3$ per molecule is OH, alkoxy or acyloxy; and e, f and g are each integers, wherein $5 \leq f \leq 20$, $g<80$ and $0 \leq e \leq 3$, more preferably wherein $5 \leq f \leq 15$, $g \leq 40$ and $0 \leq e \leq 2$, even more preferably wherein g is 0. Preferably, $R^1$, $R^2$ and $R^3$ are $(C_1-C_6)$alkyl, $(C_1-C_6)$alkoxy and $(C_6-C_{12})$acyloxy, more preferably methyl, such that the fluid has from about 0.05 up to about 10 weight percent hydroxy, alkoxy or acyloxy radicals attached to the silicon atoms.

Suitable functional polydialkylsiloxanes are made by known methods familiar to those skilled in the art and are commercially available.

Compounds suitable as the polydialkylsiloxane fluid component of the present invention are those that are commercially available, for example SF 96-1000, a polydimethylsiloxane fluid available commercially from GE Silicones, Waterford, N.Y. Preferably, the polydialkylsiloxane fluids have a viscosity of from 50 to about 50,000 centipoise at 25° C., more preferably from about 100 to about 300 centipoise at 25° C., even more preferably from about 350 to about 20,000 centipoise at 25° C. Preferably, the polydialkylsiloxane fluid of the present invention is a substantially linear polymer. As used herein, "substantially linear" means that there is little or no branching of the siloxane polymer.

In a preferred embodiment, the polydialkylsiloxane fluid component comprises one or more polysiloxanes having repeating units of the average structural formula (III):

$$R^5_a SiO_{(4-a)/2} \quad (III)$$

wherein:
    each $R^5$ is independently a substituted or unsubstituted hydrocarbon radical having from 1 to 10 carbon atoms, preferably from 1 to 4 carbon atoms, more preferably, $(C_1-C_4)$alkyl, and most preferably methyl, and on average, $1 \leq a \leq 3$.

In a preferred embodiment, the polydialkylsiloxane fluid comprises compounds of the average formulas $(CH_3)_3SiO_{1/2}$ and $(CH_3)_2SiO_{2/2}$.

Suitable polydialkylsiloxane fluids are made by methods known to those skilled in the art and are commercially available.

Compounds suitable as the curing agent of the present invention are those that promote the reaction of the functional groups of components (a) and (b). Preferably, the curing agent is a carboxylic acid salt of zinc, titanium, tin, zirconium or a combination thereof, such as, for example, zinc 2-ethylhexanoate, zinc octoate, a titanate ester, tetraisopropyltitanate, tetrabutyltitanate, dibutyltin dilaurate, dimethyltin dineodecanoate, dibutyltin dioctoate, dimethyltin oxide, dimethylhydroxytin oleate, dibutyltin bis (acetylacetonate), and zirconium 2-ethylhexanoate.

In a preferred embodiment, the curing agent is a zinc salt of a carboxylic acid such as, for example, zinc 2-ethylhexanoate and zinc octoate, preferably zinc 2-ethylhexanoate.

Suitable curing agents are commercially available.

Optionally, solvents may be used with the composition of the present invention. In a highly preferred embodiment, solvents are used to make the composition easier to use. In a preferred embodiment, the solvent is an organic solvent or mixture of organic solvents, such as, for example, toluene, xylene, naptha, propylene glycol monoethyl ether, and the like, preferably a mixture of at least two of the organic solvents.

The components of the composition of the present invention are mixed together in any order and agitated to achieve a homogeneous solution. If a solvent is used, it can be added at any time. The curing agent may be added at the same time, or if the mixture will not be used immediately, it may be added just prior to use as a coating.

The composition of the present invention may also contain other optional ingredients known in the art. Examples of other ingredients include, but are not limited to, pigments, colorants, stabilizers, and any other ingredient known to the art to be useful for coatings.

The composition of the present invention can be applied to a surface using any conventional coating technique, such as, for example, brushing, spraying, dipping, flow coating, or any other coating method known in the art. Preferably, the composition of the present invention is coated by spray or dip coating.

The composition of the present invention can be applied to bakeware surfaces, preferably the surface is a metal substrate, such as, for example, steel, aluminum, copper, tin, and alloys of these metals. Most preferably, the substrate is

metal bakeware. The metal bakeware may be of the type found in the home or in commercial cooking and baking, more preferably commercial cooking and baking. The composition of the present invention, when coated and cured on a substrate, forms a hard coating with highly desirable release characteristics. Preferably, the hardness, measured as Pencil Hardness, is $\geq$H, more preferably, hardness is $\geq$2H. Preferably, release, measured as peel adhesion by applying Tesa tape to the coated panel, is less than 500 g/in., more preferably, less than 400 g/in., even more preferably, less than 300 g/in.

The following examples illustrate the process of the present invention. They are illustrative and the claims are not to be construed as limited to the examples.

EXAMPLE 1

This example illustrates a coating composition with the silanol polydimethylsiloxane fluid at the lower end of the acceptable range.

A methylsiloxane release coating was prepared by mixing together 40.4 parts by weight of a 50 weight percent solution of a silanol functional resin comprised of about 89.5 mole percent $CH_3SiO_{3/2}$ units, about 9.0 mole percent $(CH_3)_2SiO$ units and about 1.5 mole percent $(CH_3)_3SiO_{1/2}$ units; 0.2 parts by weight of a polydimethysiloxane fluid; 0.75 parts by weight of an 8 percent by weight zinc 2-ethylhexanoate solution; and 58.6 parts by weight of a solvent mixture comprised of 33.0 parts by weight of toluene, and 25.6 parts by weight of propylene glycol monoethyl ether.

The coating was flow coated onto an anodized aluminum panel and then cured for about 60 minutes at 400° F. The panel was placed in a 500° F. oven for 24 hours, and then cooled to room temperature. The coating cracked and delaminated from the panel.

EXAMPLE 2

Example 1 was repeated using 1.73 parts of the silanol polydimethylsiloxane fluid.

The coating was flow coated onto an anodized aluminum panel and then cured for about 60 minutes at 400° F. The panel was placed in a 500° F. oven for 24 hours, and then cooled to room temperature. The coating did not crack or delaminate. The panel was then bent 180 degrees at a ¼ inch radius, and no loss of adhesion was observed.

EXAMPLE 3

This example illustrates a coating composition with a polydimethylsiloxane added to the composition.

A methylsiloxane release coating was prepared by mixing together 39.3 parts by weight of a 50 weight percent solution of a silanol functional resin comprised of about 89.5 mole percent $CH_3SiO_{3/2}$ units, about 9.0 mole percent $(CH_3)_2SiO$ units and about 1.5 mole percent $(CH_3)_3SiO_{1/2}$ units; 1.73 parts by weight of a silanol polydimethylsiloxane fluid having a viscosity of 17,400 centipoise ("cps"); 0.01 parts by weight of a 1,000 centistokes polydimethysiloxane; 1.08 parts by weight of an 8 percent by weight zinc 2-ethylhexanoate solution; and 58.8 parts by weight of a solvent mixture comprised of 33.1 parts by weight of toluene, and 25.7 parts by weight of propylene glycol monoethyl ether.

The coating was flow coated onto an anodized aluminum panel and then cured for about 60 minutes at 400° F. The panel was placed in a 500° F. oven for 24 hours, and then cooled to room temperature. The coating did not crack or delaminate. The panel was then bent 180 degrees at a ¼ inch radius, and no loss of adhesion was observed. The coated panel gloss was measured by determining the difference between the 60 degree gloss for an uncoated and coated panel after 24 hours at 500° F., and it was found to be 71.

EXAMPLE 4

Example 3 was repeated, except that the polydimethylsiloxane was increased to 0.51 parts.

The coating was flow coated onto an anodized aluminum panel and then cured for about 60 minutes at 400° F. The panel was placed in a 500° F. oven for 24 hours, and then cooled to room temperature. The coating did not crack or delaminate, however uncured fluid was observed on the surface. A tape (Scotch™ 610) was applied to the surface and removed, then adhesive to adhesive contact was made. The tape showed a loss of adhesion indicating fluid transfer to the tape from the coated panel. The panel was then bent 180 degrees at a ¼ inch radius, and no loss of adhesion was observed.

EXAMPLE 5

This example further illustrates the use of a polydimethylsiloxane in the coating composition.

A methylsiloxane release coating was prepared by mixing together 39.3 parts by weight of a 50 weight percent solution of a silanol functional resin comprised of about 89.5 mole percent $CH_3SiO_{3/2}$ units, about 9.0 mole percent $(CH_3)_2SiO$ units and about 1.5 mole percent $(CH_3)_3SiO_{1/2}$ units; 1.0 parts by weight of a silanol polydimethylsiloxane fluid having a viscosity of 17,400 centipoise ("cps"); 0.24 parts by weight of a 1,000 centistokes polydimethysiloxane; 0.64 parts by weight of an 8 percent by weight zinc 2-ethylhexanoate solution; and 58.8 parts by weight of a solvent mixture comprised of 33.1 parts by weight of toluene, and 25.7 parts by weight of propylene glycol monoethyl ether.

The coating was flow coated onto an anodized aluminum panel and then cured for about 60 minutes at 400° F. The panel was placed in a 500° F. oven for 24 hours, and then cooled to room temperature. The coating did not crack or delaminate, however uncured fluid was observed on the surface. A tape (Scotch™ 610) was applied to the surface and removed, then adhesive to adhesive contact was made. The tape showed a loss of adhesion indicating fluid transfer to the tape from the coated panel. The panel was then bent 180 degrees at a ¼ inch radius, and no loss of adhesion was observed.

EXAMPLE 6

This example illustrates a coating with a polydimethylsiloxane replacing the silanol polydimethylsiloxane in the coating composition.

A release coating was prepared by mixing together 40.4 parts by weight of a 50 weight percent solution of a silanol functional resin comprised of about 89.5 mole percent $CH_3SiO_{3/2}$ units, about 9.0 mole percent $(CH_3)_2SiO$ units, and about 1.5 mole percent $(CH_3)_3SiO_{1/2}$ units; about 1.8 parts by weight of a polydimethylsiloxane fluid having a viscosity of about 30,340 centipoise; 0.75 parts by weight of an 8 percent by weight zinc 2-ethylhexanoate solution; 0.05 parts by weight of tetrabutyl titanate (14% titanium); and 66 parts by weight of a solvent mixture comprised of 32.1 parts by weight of toluene, and 24.9 parts by weight of propylene glycol monoethyl ether.

The coating was flow coated onto an anodized aluminum panel and then cured for about 60 minutes at 400° F. The panel was placed in a 500° F. oven for 24 hours, and then cooled to room temperature. The coating did not crack or delaminate, however uncured fluid was observed on the surface.

EXAMPLE 7

This example illustrates a preferred coating composition of the present invention.

A methylsiloxane release coating was prepared by mixing together 39.3 parts by weight of a 50 weight percent solution of a silanol functional resin comprised of about 89.5 mole percent $CH_3SiO_{3/2}$ units, about 9.0 mole percent $(CH_3)_2SiO$ units and about 1.5 mole percent $(CH_3)_3SiO_{1/2}$ units; 0.8 parts by weight of a silanol polydimethylsiloxane fluid having a viscosity of 17,400 centipoise ("cps"); 0.05 parts by weight of a polydimethysiloxane fluid; 0.5 parts by weight of an 8 percent by weight zinc 2-ethylhexanoate solution; and 59.35 parts by weight of a solvent mixture comprised of 24.5 parts by weight of toluene, 19.85 parts by weight of propylene glycol monoethyl ether, and 15.0 parts by weight of naptha. The above composition was prepared in an enclosed mixing vessel fitted with nitrogen atmosphere, and agitated for 30 minutes until a solution was formed. The viscosity was 4.5 centistokes with a solids content of 20.9 weight percent at 25° C.

The coating was flow coated onto an anodized aluminum panel, and the coating was cured for 60 minutes at 400° F. Release was measured by applying to different adhesive tapes to the coated panel (Tesa 4561 and Tesa 7475, commercially available from Tesa). The panel was then placed between glass plates, a 1 kilogram weight was placed on top of the glass plates, and then the plates were put into a 70° C. oven for 20 minutes. The plates were removed and the panel was equilibrated to room temperature, 50 percent relative humidity. Peel adhesion (gram/inch) was measured using a standard 180 degree peel test, 12 inches/minute. An additional panel was aged for 24 hours in a 500° F. oven and checked for crazing and delamination. Results are shown in Table 1 below.

EXAMPLE 8

This example illustrates a coating composition with a polydimethylsiloxane replacing the silanol polydimethylsiloxane in the coating composition.

A release coating was prepared by mixing together 40.4 parts by weight of a 50 weight percent solution of a silanol functional resin comprised of about 89.5 mole percent $CH_3SiO_{3/2}$ units, about 9.0 mole percent $(CH_3)_2SiO$ units, and about 1.5 mole percent $(CH_3)_3SiO_{1/2}$ units; about 0.20 parts by weight of a 100 centistokes polydimethylsiloxane fluid; 0.75 parts by weight of an 8 percent by weight zinc 2-ethylhexanoate solution; 0.05 parts by weight of tetrabutyl titanate (14% titanium); and 58.6 parts by weight of a solvent mixture comprised of 33.0 parts by weight of toluene, and 25.6 parts by weight of propylene glycol monoethyl ether.

The coating was flow coated onto an anodized aluminum panel and then cured for about 60 minutes at 400° F. Release was measured as per Example 7, and the results are shown in Table 1.

Comparison Example 1

This example illustrates a coating composition containing phenyl substitutions.

A comparison release coating (phenylsiloxane) was prepared by mixing together 33.4 parts by weight of a 60 weight percent solution of a silanol functional resin comprised of about 60 mole percent $CH_3SiO_{3/2}$ units, about 5 mole percent $(CH_3)_3SiO_{1/2}$ units and about 35 mole percent $(C_6H_5)SiO_{3/2}$ units; 0.032 parts by weight of a 100 centistokes dimethyldiphenylsiloxane fluid with about 9 mole percent phenyl; 0.16 parts by weight of a high molecular weight dimethyldiphenylsiloxane gum with about 14 mole percent phenyl; 0.006 parts of a 350 centistokes polydimethylsiloxane; 0.15 parts by weight of an 8 percent by weight zinc 2-ethylhexanoate solution; 6.8 parts by weight of toluene; and 43.2 parts by weight of naptha.

The coating was flow coated onto an aluminum panel and then cured for about 60 minutes at 400° F. Release was measured as per Example 7 and the results are shown in Table 1. A ⅛ inch coating was prepared by evaporation of the solvents then cured at 400° F. for 60 minutes. The coating was removed from the mold and pulverized, then it was analyzed for polychlorinated biphenyl level ("PCB"). The PCB level was determined to be 4.3 ppb for this composition.

TABLE 1

Peel and Aging Results

| Example # | 24 hour aging (500° F.) | Tesa 4561 Tape (g/in) | Tesa 7475 Tape (g/in) |
|---|---|---|---|
| 7 | Passed | 57 | 23 |
| 8 | Failed, crazing, delam. | 213 | 160 |
| Comparison 1 | Passed | 819 | 1766 |

EXAMPLES 9 to 14

These examples illustrate acceptable viscosity levels for the functional polydimethylsiloxane of the present invention. The compositions were coated onto aluminum panels and cured for 60 minutes at 400° F.

TABLE 2

Coating Compositions with varying functional fluid viscosity

| Example Number: | 9 | 10 | 11 | 12 | 13 | 14 |
|---|---|---|---|---|---|---|
| Silanol Resin (same as Example 7) | 39.3 g | 39.3 g | 39.3 g | 39.3 g | 39.3 g | 39.3 g |
| Polydimethylsiloxane (same as Example 7) | 0.05 g | 0.05 g | 0.05 g | 0.05 g | 0.05 g | 0.05 g |
| 8% Zinc 2-ethylhexanoate | 0.25 g | 0.25 g | 0.25 g | 0.25 g | 0.25 g | 0.25 g |
| 6% Iron Hex-Chem | 0.25 g | 0.25 g | 0.25 g | 0.25 g | 0.25 g | 0.25 g |
| Hexane | 60 g | 60 g | 60 g | 60 g | 60 g | 60 g |
| Silanol Polydimethylsiloxane Viscosity: | | | | | | |

TABLE 2-continued

Coating Compositions with varying functional fluid viscosity

| Example Number: | 9 | 10 | 11 | 12 | 13 | 14 |
|---|---|---|---|---|---|---|
| 33.6 cstks. | 0.8 g | | | | | |
| 577 cstks. | | 0.8 g | | | | |
| 3,304 cstks. | | | 0.8 g | | | |
| 17,400 cps. | | | | 0.8 g | | |
| 30,440 cps. | | | | | 0.8 g | |
| 1,274,000 cps. | | | | | | 0.8 g |
| Delta 60° Gloss (Initial-Final after 24 hrs. @ 500o F) | 53 | 38 | 33 | 30 | Not tested* | Fail |
| 24 hr., 500° F. | Pass | Pass | Pass | Pass | Pass | Fail |
| 24 hr., 500° F., 180° ¼inch Bend | Fail | Pass | Pass | Pass | Fail | Fail |
| Pencil Hardness | 2H | 2H | 2H | 2H | H | Not tested* |

*Not tested due to failed adhesion

EXAMPLES 15 to 20

These examples illustrate acceptable viscosity levels for the polydimethylsiloxane of the present invention. The compositions were coated onto aluminum panels and cured for 60 minutes at 400° F.

TABLE 3

Compositions with varying polydimethylsiloxane viscosity

| Example Number: | 15 | 16 | 17 | 18 | 19 | 20 |
|---|---|---|---|---|---|---|
| Resin (same as Example 1) | 39.3 g | 39.3 g | 39.3 g | 39.3 g | 39.3 g | 39.3 g |
| Silanol Polydimethylsiloxane (same as Example 1) | 0.8 g | 0.8 g | 0.8 g | 0.8 g | 0.8 g | 0.8 g |
| 8% Zinc 2-ethylhexanoate | 0.25 g | 0.25 g | 0.25 g | 0.25 g | 0.25 g | 0.25 g |
| 6% Iron Hex-Chem | 0.25 g | 0.25 g | 0.25 g | 0.25 g | 0.25 g | 0.25 g |
| Hexane | 60 g | 60 g | 60 g | 60 g | 60 g | 60 g |
| Polydimethylsiloxane Viscosity: | | | | | | |
| 20 cstks. | 0.05 g | | | | | |
| 50 cstks. | | 0.05 g | | | | |
| 350 cstks. | | | 0.05 g | | | |
| 1,000 cstks. | | | | 0.05 g | | |
| 30,000 cps. | | | | | 0.05 g | |
| 600,000 cps. | | | | | | 0.05 g |
| Delta 60° Gloss (Initial-Final after 24 hrs. @ 500° F.) | 27 | 31 | 30 | 30 | 28 | 27 |
| 24 hr., 500° F. | Pass | Pass | Pass | Pass | Pass | Pass |
| 24 hr., 500° F., 180° ¼inch Bend | Pass | Pass | Pass | Pass | Pass | Pass |
| Pencil Hardness | 1H | 1H | 2H | 2H | 1H | H* |

*coating cloudy

What is claimed is:

1. A curable silicone bakeware release composition comprising:
   a) a functional silicone resin, comprising $RSiO_{3/2}$, $R_2SiO$, and $R_3SiO_{1/2}$ units, wherein each R is independently alkyl, OH, alkoxy or acyloxy, provided that at least one R per molecule is OH, alkoxy or acyloxy;
   b) a functional polydialkylsiloxane fluid;
   c) a polydialkylsiloxane fluid; and
   d) an effective amount of a curing agent,
wherein the composition is substantially free of aryl substituted silicone compounds.

2. The silicone release coating composition of claim 1, wherein the composition comprises, based upon 100 parts by weight:
   a) from about 35.0 to about 99.895 parts by weight of the functional silicone resin;
   b) from about 0.1 to about 2.0 parts by weight of the functional polydialkylsiloxane fluid; and
   c) from about 0.005 to about 2.0 parts by weight of the polydialkylsiloxane fluid.

3. The release coating composition of claim 2, further comprising a solvent.

4. The release coating composition of claim 3, wherein the solvent comprises from about 55.0 to about 65.0 parts by weight.

5. The release coating composition of claim 3, wherein the solvent is an organic solvent or mixture of organic solvents.

6. The release coating composition of claim 1, wherein the curing agent is a carboxylic acid salt of zinc, titanium, tin, zirconium or a combination thereof.

7. The release coating composition of claim 1, wherein the functional silicone resin comprises one or more compounds of the structural formula:

$$M_zD_xT_y$$

wherein:
   M is $R_3SiO_{1/2}$;
   D is $R_2SiO_{2/2}$; and
   T is $RSiO_{3/2}$;

each R is independently $CH_3$, OH, alkoxy or acyloxy; and x, y and z are integers, wherein $5 \leq x \leq 20$, $80 \leq y \leq 95$ and $1 \leq z \leq 3$, wherein the resin has from about 0.05 to about 10 weight percent hydroxy, alkoxy or acyloxy radicals attached to the silicon atoms.

8. The release coating composition of claim 1, wherein the functional polydialkylsiloxane fluid comprises one or more polysiloxanes having repeating units of the average structural formula:

$$R^4{}_a SiO_{(4-a)/2}$$

wherein:

$R^4$ is a hydrocarbon radical having from about 1 to about 10 carbon atoms or OH, alkoxy or acyloxy, and on average, $1 \leq a \leq 3$.

9. The release coating composition of claim 8, wherein $R^4$ is OH.

10. The release coating composition of claim 8, wherein a is 2.

11. The release coating composition of claim 1, wherein the functional silicone fluid comprises one or more compounds of the structural formula:

$$M_e D_f T_g$$

wherein:

M is $R^1{}_3 SiO_{1/2}$;

D is $R^2{}_2 SiO_{2/2}$; and

T is $R^3 SiO_{3/2}$;

each $R^1$, $R^2$ and $R^3$ is independently $CH_3$, OH, alkoxy or acyloxy; and e, f and g are each integers, wherein $5 \leq f \leq 20$, $g<80$ and $0 \leq e \leq 3$, wherein the fluid has from about 0.05 to about 10 weight percent hydroxy, alkoxy or acyloxy radicals attached to the silicon atoms.

12. The release coating composition of claim 1, wherein the polydialkylsiloxane fluid component comprises one or more polysiloxanes having repeating units of the average structural formula:

$$R^5{}_a SiO_{(4-a)/2}$$

wherein:

$R^5$ is a hydrocarbon radical having from 1 to 10 carbon atoms, and on average, $1 \leq a \leq 3$.

13. The release coating composition of claim 12, wherein $R^5$ is methyl.

14. The release coating composition of claim 12, wherein the polydialkylsiloxane fluid component comprises one or more polysiloxanes having repeating units of the average formula $(CH_3)_3 SiO_{1/2}$ and $(CH_3)_2 SiO_{2/2}$.

15. An article formed by applying the release coating of claim 1 to a substrate.

16. The article of claim 15, wherein the release coating is applied to the substrate by spray coating or dip coating.

17. The article of claim 15, wherein the substrate is a metal bakeware surface.

* * * * *